United States Patent [19]

Adams

[11] 4,435,675
[45] Mar. 6, 1984

[54] BATTERY CHARGING SYSTEM

[75] Inventor: Derek S. Adams, Solihull, England

[73] Assignee: Lucas Industries plc., Birmingham, England

[21] Appl. No.: 380,258

[22] Filed: May 20, 1982

[30] Foreign Application Priority Data

May 30, 1981 [GB] United Kingdom ............... 8116598

[51] Int. Cl.³ .......................................... H01M 10/44
[52] U.S. Cl. ....................................... 320/22; 320/39
[58] Field of Search ................. 320/10, 20, 22, 35, 320/39, 40, 43, 14, 37, 38, 48

[56] References Cited

U.S. PATENT DOCUMENTS

| | | | |
|---|---|---|---|
| 3,424,916 | 1/1969 | Fenley | 320/43 X |
| 3,727,074 | 4/1973 | Keller et al. | 320/43 X |
| 3,947,743 | 3/1976 | Mabuchi et al. | 320/14 X |
| 4,270,080 | 5/1980 | Kostecki | 320/39 X |
| 4,308,492 | 12/1981 | Mori et al. | 320/43 X |
| 4,320,333 | 3/1982 | Hase | 320/43 |
| 4,342,954 | 8/1982 | Griffith | 320/37 X |

Primary Examiner—William M. Shoop
Attorney, Agent, or Firm—Trexler, Bushnell & Wolters, Ltd.

[57] ABSTRACT

A battery charging system comprises a battery which may be selectively connected to a load or a battery charger. The system further includes a discharge monitor the output of which is connected to five of the address inputs of ROM, the remaining five inputs of which are connected to the output of a counter driven by a clock. The output of ROM is connected to the input of a D/A converter, the output of which is connected to the current control input of a charger. ROM is programmed with a set of charging schedules of equal duration. In operation, at the commencement of a charging cycle, a particular schedule is selected by the discharge monitor and the system is then driven through the selected schedule by the counter and the clock.

6 Claims, 5 Drawing Figures

BATTERY CHARGING SYSTEM

This invention relates to a battery charging system.

When charging a fully discharged battery, the charging current is chosen so as to re-charge the battery in the time available. When re-charging a partially discharged battery, the amount of charge which is required is less than in the case of a fully discharged battery. In some known charging systems, the charge is reduced by shortening the time spent in one or more phases of the charging cycle. In other known systems, the charge is reduced by commencing the charging cycle at an intermediate position. In both these types of known systems, a partially discharged battery will be fully re-charged in a shorter period than a fully discharged battery and, where a fixed time is available for re-charging the battery, the systems do not make maximum advantage of this time. In general, charging efficiency falls both with the progression through each phase and also with progression through the entire charging cycle. Thus, when charging a partially discharged battery these known systems use the less efficient part of the charging cycle with the result that the overall charging efficiency is less than for a fully discharged battery.

It is an object of this invention to provide a battery charging system in which the charging efficiency is maintained as high as possible when charging a partially discharged battery.

According to this invention there is provided a battery charging system comprising a battery, means for determining the state of charge of the battery at the commencement of charging, means for supplying current to the battery, and means for controlling the current supply means, said control means being responsive to the state of charge determining means and being programmed so that during at least the last part of a particular charging cycle the charging current follows a schedule which is selected in accordance with the state of charge at the commencement of the charging cycle and arranged so that the duration of the entire charging cycle is equal to a desired period of time.

By following a charging schedule which is selected in accordance with the state of discharge at the commencement of charging, a partially discharged battery may be re-charged at a higher efficiency in comparison with the known systems discussed above. Where a battery has a fixed period available for recharging, as is the case with a traction battery for an electric vehicle which is charged over night, the control charging cycle follows a schedule which makes maximum advantage of the time which is available.

This invention will now be described in more detail by way of example with reference to the accompanying drawings in which.

Figure 1:
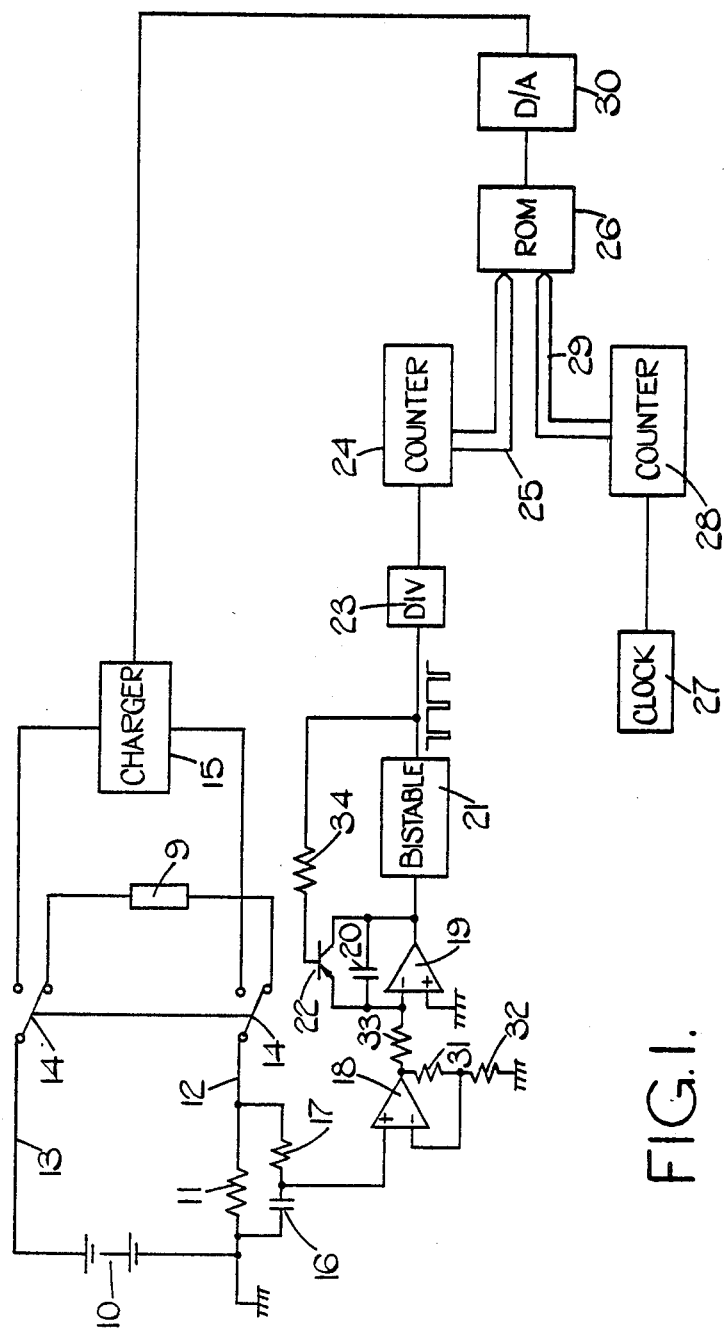
FIG. 1 is a block diagram of a battery charging system embodying this invention.

Referring now to FIG. 1, there is shown a battery charging system which comprises a battery 10 which may be, for example, an electric vehicle traction battery. The negative terminal of the battery 10 is connected to earth and through a resistor 11 to a rail 12 and the positive terminal of the battery 10 is connected to a rail 13. The rails 12 and 13 may be selectively connected by ganged switches 14 to a load 9, such as an electric vehicle drive system, or to a battery charger 15.

The charger 15 may take the form of the charger shown in FIGS. 2 and 5 of United Kingdom patent application No. 2,080,642.

A capacitor 16 and a resistor 17 are connected in series across the resistor 11 and the junction of capacitor 16 and resistor 17 is connected in the non-inverting input of an operational amplifier 18. The output of amplifier 18 is grounded through a pair of resistors 31 and 32 and the junction of these resistors is connected to the inverting input of amplifier 18. Thus, the output voltage of amplifier 18 is proportional to the discharge current of battery 10. The output of amplifier 18 is connected to the inverting input of an operational amplifier 19, the non-inverting input of which is grounded. The output of amplifier 19 is connected to its inverting input by an integrating capacitor 20 and also to the input of a bistable 21. The output of bistable 21 is connected through a resistor 34 to the base of a PNP transistor 22, the collector-emitter path of which bridges capacitor 20. Thus, it is arranged that a train of negative going pulses is produced at the output of bistable 21, the frequency of which depends on the discharge current. The output of bistable 21 is connected to the input of a divider 23. By choosing a suitable division number for divider 23, pulses may be produced at its output after each discharge of an appropriate number of ampere-hours. The output of divider 23 is connected to the clock input of a counter 24. Thus, the counter 24 records discharge of battery 10. The counter 24 is disabled during charging. The output of counter 24 is connected via a data bus 25 to five of the address inputs of a read-only-memory (ROM) 26.

The system also includes a clock pulse generator 27 which produces clock pulses at, for example, 15 minute intervals. The clock pulses are supplied to the clock input of a counter 28, the output of which is connected via a data bus 29 to the five remaining address inputs of ROM 26. The counter 28 is enabled during charging. The data output of ROM 26 is connected to the input of a digital to analog converter 30, the analog output of which is connected to the current control input of charger 15.

Figure 2A:
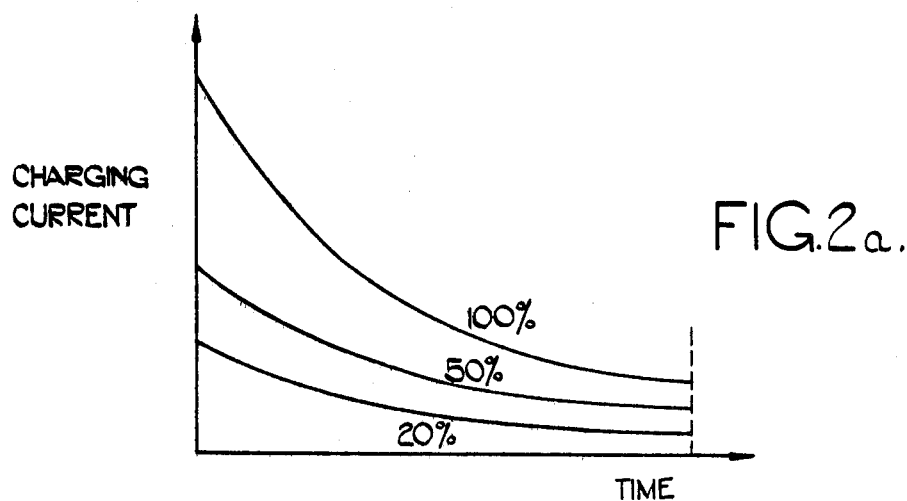
FIGS. 2a and 2b are graphs of two examples of some of the charging schedules used in the system of FIG. 1.
Figure 2B:
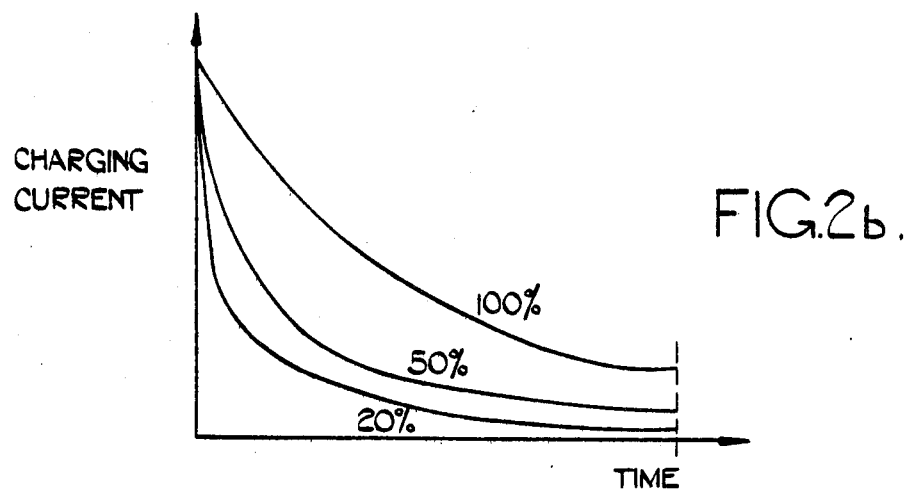

The memory 26 is programmed with a set of charging schedules each of which corresponds to a range of states of discharge of battery 10 at the commencement of charging. Each charging schedule supplies a predetermined charge to the battery which is sufficient to recharge it and all the schedules are of equal duration. The duration of the schedule represents the time which is normally available for recharging the battery 10. For example, in the case of an electric vehicle traction battery the duration may be 12 hours so that the battery can be charged overnight. Referring to FIGS. 2a and 2b, there are indicated two separate examples of charging schedules for a battery which is about 20%, 50% or 100% discharged at the commencement of charging. In the example shown in FIG. 2a, the schedules commence at progressively lower charging current whilst in the example shown in FIG. 2b all schedules commence at the same charging current.

In operation, a particular schedule is selected at the commencement of charging by the output of counter 24 and ROM 26 is driven through the schedule by counter 28.

As an alternative to following a particular programmed schedule, the charging cycle could follow a path interpolated between two schedules, the memory being programmed with a suitable set of charging schedules. In this case, the charging cycle follows a path which corresponds to the particular state of discharge instead of following a path which corresponds to a range of discharge states.

Figure 3:
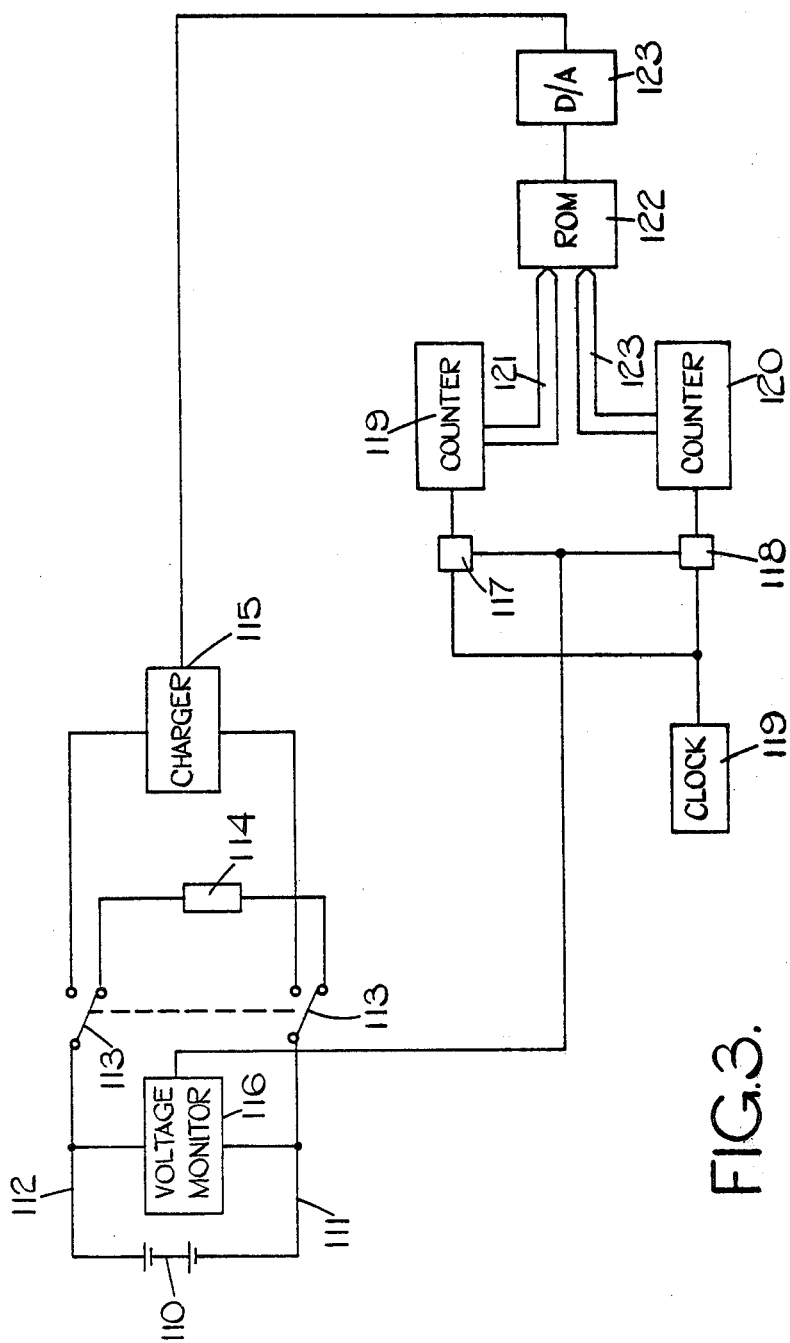
FIG. 3 is a block diagram of another battery charging system embodying this invention.

Referring now to FIG. 3, there is shown a battery charging system in which the state of discharge at the commencement of charging is determined by measuring the time spent in the initial part of the charging cycle and which then selects a schedule from a set of schedules for the last part of the charging cycle. The system shown in FIG. 3 comprises a battery 110 the negative terminal of which is connected to a rail 111 and the positive terminal of which is connected to a rail 112. The rails 111 and 112 may be selectively connected by ganged switches 113 to a load 114, such as an electric vehicle drive system, or to a battery charger 115. The charger may take the form as shown in FIGS. 2 and 5 of published United Kingdom patent application No. 2,080,642.

The system further includes a monitor 116 for measuring the battery voltage compensated for temperature during the first part of the charging cycle. The output of the monitor 116 is connected to the control inputs of a pair of gates 117 and 118. A clock pulse generator 119 which produces clock pulses at intervals of 15 minutes is connected through the gates 117 and 118 to the clock inputs of a pair of counters 119 and 120. The output of counter 119 is connected via a data bus 121 to five of the address inputs of a read-only-memory (ROM) 122. The output of counter 120 is connected via a data bus 123 to the five remaining address inputs of ROM 122. The output of ROM 122 is connected to the input of a digital to analog converter 123, the analog output of which is connected to the current control input of charger 125. The ROM 122 is provided with a set of charging schedules for the last part of the charging cycle.

In operation, during the first part of the charging cycle the battery is charged at a fixed current and gate 117 is open and gate 118 is closed. Thus, the counter 119 records the time spent in the first part of the charging cycle. Then, when the temperature compensated battery voltage reaches a predetermined value, this is detected by the monitor 116 which closes gate 117 and opens gate 118. A charging schedule for the last part of the cycle is then selected by the output of counter 119 and ROM 122 is driven through this schedule by counter 120.

Figure 4:
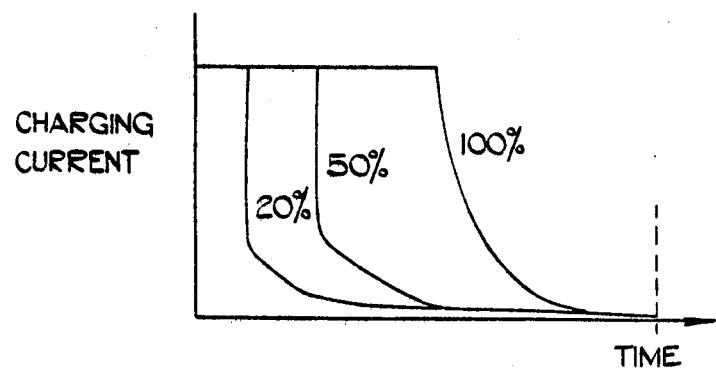
FIG. 4 is a graph of some of the charging schedules used in the system of FIG. 3.

Referring to FIG. 4, there are shown charging cycles of batteries which are about 20%, 50% or 100% discharged at the commencement of charging. In the case of an electric vehicle traction battery, the three cycles may, for example, supply respective total charges of 30Ah, 60Ah, and 115Ah. It is to be noted that the charging schedules for the last part of charging are arranged so that the duration of the entire charging cycle is equal to the same value in each, and this value is selected to correspond to the time which is available for the entire cycle.

In another arrangement, not shown, the state of discharge is determined by measuring the time which elapses before gassing reaches a certain level.

In a modification of the system shown in FIGS. 1 to 4, there are provided several sets of charging schedules each set corresponding to a particular charging period. Thus, in the case of the embodiment shown in FIG. 1, there may be a first set of charging schedules for recharging the battery in 12 hours, a second set for recharging it in 8 hours, and a third set for recharging it in 16 hours. With this arrangement, the user would select the set of charging schedules which corresponded to the time which was available.

In another modification, the total discharge of the battery is measured during its entire life to provide an indication of the age of the battery. The age of the battery is then used as a further parameter in selecting the charging schedule.

In yet another modification, the temperature of the battery is used as a further parameter to select the charging schedule.

Although the systems described with reference to FIGS. 1 to 4 are digital, the present invention could also be embodied as an analog system.

I claim:

1. A battery charging system comprising a battery, means for determining the state of charge of the battery at the commencement of charging, means for supplying current to the battery, and means for controlling the current supply means, said control means being responsive to the state of charge determining means and being programmed so that during at least the last part of a particular charging cycle the charging current follows a schedule which is selected from a set of charging schedules each of which corresponds to a particular state of charge at the commencement of the charging cycle and each of which is is arranged so that the duration of the entire charging cycle is equal to a desired period of time.

2. A battery charging system as claimed in claim 1 in which the state of charge determining means comprises a discharge monitor, and in which the control means is programmed so that the charging current follows a selected schedule throughout the charging cycle.

3. A battery charging system as claimed in claim 1 in which the state of charge determining means comprises a monitor which detects the time spent in an initial part of the charging cycle and in which the control means is programmed so that the charging current follows a selected schedule for the last part of the charging cycle.

4. A battery charging system as claimed in any one of the preceding claims in which the desired period of time may be selected at the commencement of each charging cycle.

5. A battery charging system as claimed in any one of claims 1 to 3 in which the schedule is also selected in accordance with the age of the battery.

6. A battery charging system as claimed in any one of claims 1 to 3 in which the schedule is also selected in accordance with the temperature of the battery.

* * * * *